United States Patent [19]

Culk

[11] 4,332,526
[45] Jun. 1, 1982

[54] VARIABLE PITCH PROPELLERS

[76] Inventor: Raimund Culk, Varenaweg 1, A 8043 Graz, Austria

[21] Appl. No.: 942,421

[22] Filed: Sep. 14, 1978

[30] Foreign Application Priority Data

Sep. 19, 1977 [AT] Austria .................. 6705/77

[51] Int. Cl.³ .................................. B64C 11/32
[52] U.S. Cl. .................................. 416/166; 416/202
[58] Field of Search ............ 416/166, 202; 74/571 L, 74/396; 308/17, 63, 65

[56] References Cited

U.S. PATENT DOCUMENTS

| 9,849 | 7/1853 | Brown | 416/202 X |
|---|---|---|---|
| 772,894 | 10/1904 | LeBlond et al. | 74/396 |
| 1,383,388 | 7/1921 | Carter | 416/166 X |
| 1,756,215 | 4/1930 | Schneider | 416/166 X |
| 1,835,006 | 12/1931 | Bolduc | 416/166 X |
| 1,886,891 | 11/1932 | Martens et al. | 416/202 |
| 1,908,893 | 5/1933 | Edman | 416/166 |
| 2,271,149 | 1/1942 | DiCesare | 416/202 X |
| 2,648,230 | 8/1953 | Stallsmith | 74/396 |
| 2,851,114 | 9/1958 | Rossman | 416/166 X |
| 3,234,816 | 2/1966 | Von Thuengen | 74/571 |
| 3,331,446 | 7/1967 | Feroy | 416/163 |
| 3,399,582 | 9/1968 | Henry | 74/571 |
| 3,753,375 | 8/1973 | Colletti | 74/396 X |

FOREIGN PATENT DOCUMENTS

| 252935 | 4/1964 | Australia | 416/202 |
|---|---|---|---|
| 547875 | 9/1956 | Italy | 416/166 |

*Primary Examiner*—Everette A. Powell, Jr.
*Attorney, Agent, or Firm*—Remy J. VanOphem

[57] ABSTRACT

A variable pitch propeller e.g. for light aircraft has blades which are mounted in a hub for rotation about their longitudinal axes. The ends of the blades entering the hub have a crown of peripheral teeth meshing with axially slidable racks located at the center of the hub. In order to permit adjustment of play at the teeth flanks, the crowns are arranged at the ends of the blades at right angles to the axes of the blades and can be moved towards or away from the respective racks.

6 Claims, 4 Drawing Figures

VARIABLE PITCH PROPELLERS

BACKGROUND OF THE INVENTION

1. Field of the Invention

The invention relates to variable pitch propellers whose blades are mounted in a hub for rotation about their longitudinal axes, the ends of the blades entering the hub being provided with a crown or ring of peripheral teeth which mesh with axially slidable racks lying at the center of the hub.

2. Description of the Prior Art

Smaller sports airplanes and powered gliders have almost without exception air screws as a means of propulsion, both puller propellers and pressure propellers being used. Such propeller aircraft are being used in ever increasing numbers, and for aeronautic and not least for economic reasons it is desirable to have propellers with adjustable blades. As is well known, variable pitch propellers present the advantage that the pitch of the propeller blades can be set according to each phase of flight, such as taking off, rising, travelling flight or coasting (gliding); it being also possible to preselect a braking attitude for landing. The variable pitch propellers that are commercially available at present are, however, of very complex design and correspondingly expensive. They are, moreover, conceived for larger and more powerful aircraft and for the already stated reasons cannot be considered for inexpensive, light sports airplanes.

Variable pitch propellers of the type mentioned at the outset are already known wherein the adjustability of the blades is achieved by comparatively simple means. The designs in question, however, suffer from the drawback that they may involve, owing to the finishing tolerances, either enhanced flank play between the rack and the tooth crown or mutual jamming of the two parts. Either is equally disadvantageous and indeed may be disastrous. If the tooth flank play is too great the propeller blade will not keep the exact set pitch, or, in some circumstances, the blade may start fluttering, which is deleterious from the point of view of flow dynamics. Mutual jamming of the tooth crown and rack makes adjustment impossible.

SUMMARY OF THE INVENTION

According to the invention the peripheral teeth rings which are arranged at the ends of the blades at right angles to the axes of said blades are movable towards or away from the racks, whose teeth lie on the side facing the ends of the blades, for the purpose of adjusting the play at the tooth flanks. By virtue of this construction the play at the flanks of the teeth can be accurately set, and it is thus readily possible to ensure reliable functioning of the variable pitch propeller in all circumstances.

In order to achieve the desired adjustability in an especially simple way, the blades advantageously have bearing bushes which are adjustable at right angles to the longitudinal axes of the blades to enable the teeth rings or crowns to be moved towards or away from the racks. In addition, for moving the crowns relatively to the racks, the bearing bushes of the blades may have eccentric bores and be rotatable and immobilizable in the hub.

In a particularly simple construction, the end of every blade is formed as a shaft mounted in the bearing bush on two radial ball bearings and a thrust bearing, which ensures, despite the adjustability, a very accurate and firm seating of the blade ends in the hub. The thrust bearing may be placed between the tooth crown provided at the end of the shaft and the bearing bush, whereby such centrifugal forces as may arise can be readily absorbed by the hub, without impairing the adjustability.

It is of advantage for the terminal discs of the thrust bearing to have a diameter larger than the adjacent tooth ring, so that the terminal disc facing it can also act as a lateral guide for the rack, whereby the thrust bearing takes on as a second additional function the guiding of the racks.

Furthermore, the racks may be formed as a unitary part, which forms a spacer sleeve for two further thrust bearings, by means whereof a push rod, mounted inside the hollow driving shaft of the propeller, is connected to the racks for the axial movement of the same while allowing some relative rotation between them, which establishes a reliable connection between the racks and the push rod which moves them. The push rod may be guided in the hub by the terminal discs of the further thrust bearings facing the racks. The hollow driving shaft entering the hub, on the one hand, and a bush, fitted into the hub and closing up the same, on the other, may act as slide guides for the bearing discs of the thrust bearings, owing to which the bearings are guided in an especially simple way without further expense.

It is an object of the invention to provide a variable pitch propeller which employs a crown of teeth meshing with a central rack and in which flank play between the teeth and the rack may be adjusted, thus avoiding the disadvantages of the prior art.

It is a further object of the invention to provide a variable pitch propeller which can be used in light aircraft.

DESCRIPTION OF THE PREFERRED EMBODIMENT

Figure 1:
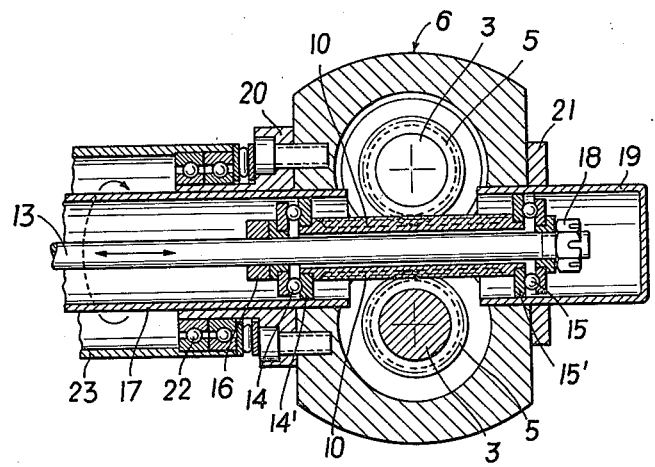
FIG. 1 shows a vertical section through the center of the hub of a two-blade propeller with the blades arranged horizontally.
Figure 2:
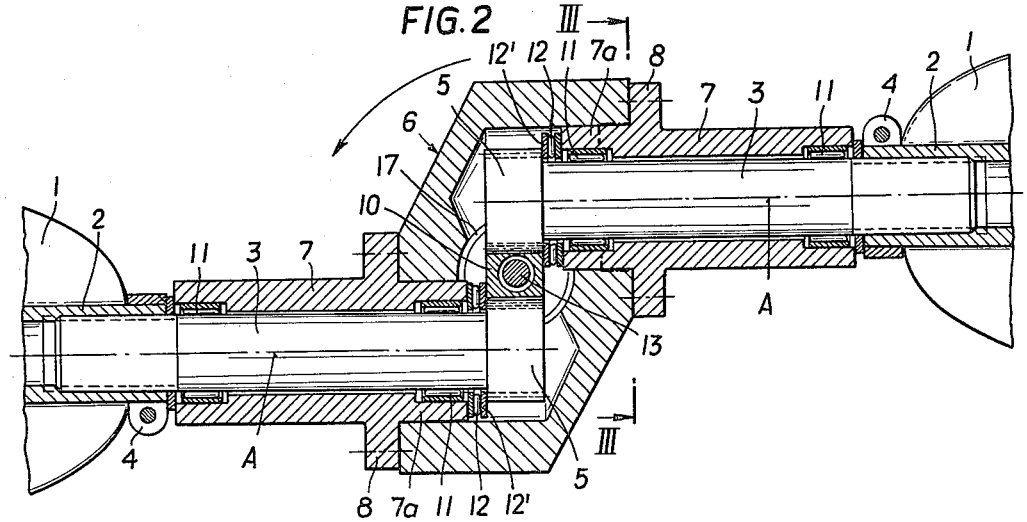
FIG. 2 is a section of the two-blade propeller of FIG. 1 along the plane of the blade axes.
Figure 3:
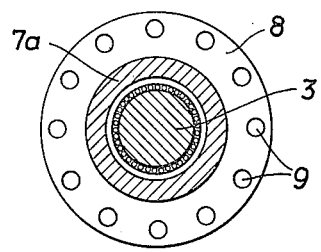
FIG. 3 is a section along the line III—III in FIG. 2.

Referring to FIGS. 1 to 3, a variable pitch propeller has two propeller blades 1 each with a tubular spar 2 of light metal. The ends of the blades 1 are formed as shafts 3 which are screwed into the tubular spars 2 of the blades 1. In order to immobilize the shafts 3 in the tubular spars 2 the latter are longitudinally divided over a short distance and provided with a clamping ring 4, whereby the two parts (shaft and spar) can be clamped to each other at any desired mutual angular position. At the inner, free end of each shaft 3 received in hub 6 there is a ring of teeth 5 which mesh with a respective rack 10. Each ring of teeth, a crown, may either be formed in one piece with the shaft 3 or fixed thereto as a separate part.

The propeller blades 1 are mounted on the hub 6 by means of bearing bushes 7. Mounting of the shafts 3 in the associated bearing bush 7 is effected in each case by two radial ball or roller bearings 11 and a thrust bearing 12, the shaft 3 being supported on the latter through its teeth ring 5 to absorb centrifugal forces. Each terminal disc 12' of the axial thrust bearing 12 has a diameter larger than that of the adjacent ring 5, so that the terminal disc of the thrust bearing facing the ring 5 acts as a guide for the rack 10.

The portion 7a of each bush 7 entering the hub 6 has a circular cylindrical jacket that is eccentric by a small amount relative to the longitudinal axis A of the blade 1 and is fitted flush into the corresponding bore of the hub 6. The bearing bush 7 has a flange 8, by which it is fixed to the hub 6. To immobilize the bearing bush 7 rotationally relative to the hub 6, the flange 8 has bores 9, twelve in the present embodiment. The hub 6 is provided with six threaded blind bores for the reception of retaining screws passing through the bores 9. This construction enables the position of the bearing bush to be adjusted through one-twelfth of the perimeter at a time and secured in a desired position. Owing to the eccentricity of portion 7A relative to axis A, which in practice amounts to from 0.5 to 1.0 mm, it is possible to adjust very exactly the position of the shafts 3 relative to the hub 6, and thus the meshing of the teeth rings 5 with the racks 10. In this way one can ensure very accurate setting of the tooth-flank play between each teeth ring 5 and the respective rack 10.

The racks 10 form jointly a common central part and are moved relative to the crowns or rings 5 by a push rod 13, which is held in position relative to the racks 10 by two thrust bearings 14, 15. These further thrust bearings 14, 15 make possible the rotation of each rack 10, which revolves with the hub, relative to the non-rotary push rod 13. The push rod 13 is guided in the hub 6 by the bearing discs 14', 15' facing each rack 10. For securing the thrust bearings 14, 15 to the push rod 13 there is provided on the latter a flange 16, on which is supported the thrust bearing 14 facing the driving shaft 17, as well as a castle nut 18, by means whereof the thrust bearing 15 can be immobilized relative to the rack 10 and through the latter relative to the thrust bearing 14.

The driving shaft 17 for the propeller extends through bearing 22 with associated flange 23 into the hub 6 and serves as a guide for the bearing discs 14' of the thrust bearing 14. The driving shaft is hollow and the push rod 13 passes longitudinally through it, projecting from it at its open end, which faces away from the propeller. An actuating lever (not shown) for varying the pitch of the propeller is connected to this projecting end of the push rod 13. The thrust bearing 15 is guided by a bearing disc 15' in a sleeve 19, which is inserted into the hub 6 and closed at its end which faces away from the hub. The hub 6 is secured to the driving shaft by means of a flange 20 provided on the latter and fitting the hub 6. The sleeve 19 also has a flange 21, with which it is screwed on to the hub 6.

In operation, the driving shaft 17 is driven using a V-belt or a toothed belt, and the pitch of the propellers is adjusted as desired or necessary using the actuating lever connected to the end of the push rod 13.

Figure 4:
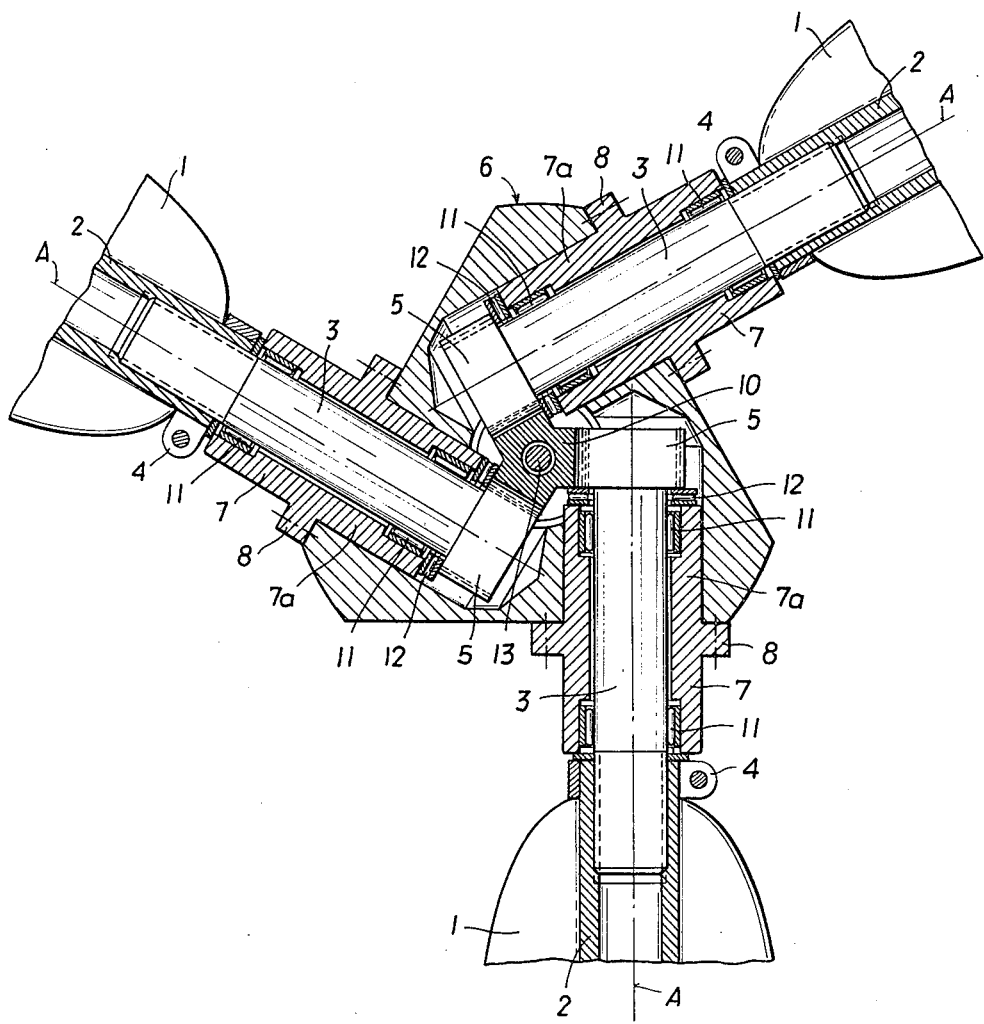
FIG. 4 represents a section analogous to that of FIG. 2 through a three-blade propeller.

The variable pitch propeller shown in FIG. 4 is of similar construction to the propeller of FIGS. 1 to 3, and like reference numerals are employed for like parts. This second embodiment has three propeller blades 1, and thus parts which are duplicate in FIGS. 1 to 3 are triplicate in FIG. 4. Apart from this difference, the design and operation is the same: as before, the play at the flanks of the teeth can be adjusted to ensure reliable functioning of the variable pitch propeller.

I claim:
1. A variable pitch propeller comprising:
a hub;
an axially slidable tooth rack centrally mounted in said hub;
at least two blades mounted to said hub, each of said at least two blades having an inner end mounted adjacent to said axially slidable tooth rack and a longitudinal axis extending through said inner end;
a crown of peripheral teeth mounted on said inner ends of each of said at least two blades, said crown of peripheral teeth further being arranged at a right angle to said longitudinal axis of each of said at least two blades, said crown of peripheral teeth having tooth flanks meshing with said axially slidable tooth rack;
means for sliding said axially slidable tooth rack in said hub to rotate each of said at least two blades about said longitudinal axis to set the pitch of said at least two blades;
means for eccentrically displacing said crown of peripheral teeth of one of said at least two blades relative to said axially slidable tooth rack in order to adjust said tooth flanks of said crown of peripheral teeth relative to said axially slidable tooth rack for the adjustment of the play between said crown of peripheral teeth and said axially slidable tooth rack so that said at least two blades will maintain the set pitch of the variable pitch propeller; said means for eccentrically displacing further comprises a single, elongated tubular bearing bush mounted to each of said blades adjacent to each of said inner end of each of said at least two blades, said tubular bearing bush having a bore coaxially aligned with said longitudinal axis, said bearing bush further being rotatably adjustably mounted in said hub in order to adjust said crown relative to said rack; and
a thrust bearing having a terminal disc, said terminal disc having a diameter larger than said crown of peripheral teeth, each of said terminal discs on said blades further facing said crown of peripheral teeth and further forming a lateral guide for said tooth rack.

2. The variable pitch propeller of claim 1, wherein each of said bearing bushes has a circular cylindrical jacket mounted adjacent to said inner end, said circular cylindrical jacket having an eccentric bore relative to said longitudinal axis of each of said at least two blades, each of said bearing bushes further being rotated to adjust said crown of peripheral teeth on each of said at least two blades relative to said axially slidable tooth rack, each of said bearing bushes further being demountably secured in said hub.

3. The variable pitch propeller of claim 2, further comprising:
a shaft formed adjacent to said inner end of each of said at least two blades, said shaft being mounted in said bearing bush;
two radial roller bearings coaxially mounted on said shaft, one of said two radial roller bearing mounted in said eccentric bore of said bearing bush adjacent to said inner end and another of said two radial roller bearings mounted adjacent to the opposite end of said bearing bush; and
a thrust bearing coaxially mounted on said shaft.

4. The variable pitch propeller of claim 3, wherein said thrust bearing is mounted on said longitudinal axis between said crown of peripheral teeth and said bearing bush.

5. The variable pitch propeller of claim 1, wherein said axially slidable tooth rack has a first end, a second end opposite said first end, and portions defining an axial bore extending from said first end to said second end.

6. The variable pitch propeller of claim 5, further comprising:

two thrust bearing discs mounted coaxially on said axially slidable tooth rack, one of said two thrust bearing discs mounted on said first end and another of said two thrust bearing discs mounted on said second end; and a push rod mounted in said axial bore of said axially slidable tooth rack, said push rod further being guided to move axially in said hub by said two thrust bearing discs mounted on said axially slidable tooth rack.

* * * * *